United States Patent [19]

Ohashi

[11] Patent Number: 4,566,373
[45] Date of Patent: Jan. 28, 1986

[54] VENTILATION ARRANGEMENT FOR AUTOMOTIVE VEHICLE OR THE LIKE

[75] Inventor: Toshio Ohashi, Atsugi, Japan

[73] Assignee: Nissan Motor Co., Ltd., Yokohama, Japan

[21] Appl. No.: 557,883

[22] Filed: Dec. 5, 1983

[30] Foreign Application Priority Data

Dec. 7, 1982 [JP] Japan .................. 57-213427

[51] Int. Cl.⁴ .............................................. B60H 1/00
[52] U.S. Cl. ....................................... 98/2.01; 98/2.07
[58] Field of Search .................. 98/2, 2.01, 2.05, 2.06, 98/2.07, 2.08, 2.11

[56] References Cited

U.S. PATENT DOCUMENTS

| | | | |
|---|---|---|---|
| 2,185,486 | 1/1940 | Wahlberg | 98/2.07 |
| 2,694,970 | 11/1954 | Schneider | 98/2.01 |
| 2,787,205 | 4/1957 | Wilfert | 98/2.06 |
| 2,832,277 | 4/1958 | Simons et al. | 98/2.06 |
| 3,288,048 | 11/1966 | Laing | 98/2.07 |
| 3,315,730 | 4/1967 | Weaver et al. | 165/23 |
| 3,387,549 | 6/1968 | Castelet | 98/2.07 |
| 4,408,713 | 10/1983 | Lijima et al. | 98/2.01 X |

FOREIGN PATENT DOCUMENTS 1189205 7/1967 United Kingdom ................ 98/2.01

Primary Examiner—Harold Joyce
Attorney, Agent, or Firm—Schwartz, Jeffery, Schwaab, Mack, Blumenthal & Evans

[57] ABSTRACT

A by-pass passage is provided around the blower of a vehicle ventilation and/or air conditioning system in order to avoid the flow resistance caused by the blower when it is not energized and accordingly increase the amount of air which may be rammed into the passenger cabin at low vehicle speeds. The passage is controlled by a door which is opened when the blower is off and the system is conditioned to induct fresh air from outside the vehicle.

5 Claims, 3 Drawing Figures

VENTILATION ARRANGEMENT FOR AUTOMOTIVE VEHICLE OR THE LIKE

BACKGROUND OF THE INVENTION

1. Field of the Invention

The present invention relates generally to a ventilation system for an automotive vehicle (or the like), and more specifically to an arrangement which permits increased amounts of air to flow without blower assistance through the ducting of the system to the passenger cabin particularly at low vehicle speeds.

2. Description of the Prior Art

In prior art ventilation systems for automotive vehicles it usual to, as shown in FIG. 1 of the drawings, arrange the blower 1 of the system downstream of the fresh/recirculate control door 2. This arrangement while permitting adequate ventilation without blower assistance at high vehicle speeds, due to the generation of a high ram pressure which forces the air past and/or around the blower vanes 3, suffers from the drawback that at low vehicle speeds due particularly to the resistance to air flow provided by the non-energized blower, insufficient air tends to be rammed from the intake box through the ducting 4 of the system to the vehicle cabin. Consequently, it is necessary to take the trouble to switch on the blower and/or open a window or windows.

SUMMARY OF THE INVENTION

It is an object of the present invention to provide an arrangement via which adequate ventilation may be achieved at relatively low vehicle speeds without the assistance of a blower and/or the need to open windows.

In brief, a by-pass passage is provided around the blower of a vehicle ventilation and/or air conditioning system in order to avoid the flow resistance caused by the blower when it is not energized, and increase the amount of air which may be rammed into the passenger cabin at low vehicle speeds. The passage is controlled by a door which is opened when the blower is off and the system is conditioned to induct fresh air from outside the vehicle.

More specifically, the present invention takes the form of a ventilation arrangement for a vehicle having a cabin, comprising: a duct leading to the cabin from a first opening through which fresh air from outside of the vehicle may be inducted, a blower disposed in the duct for forcing air to flow toward the cabin when energized, a passage which leads from the duct upstream of the blower and which merges with the duct downstream of the blower, a first device for controlling the flow of air through the passage, a second opening in the duct upstream of the blower through which air from the cabin may be induced, a second device for selectively controlling the amount of air inducted through the first and second openings, and a control arrangement for operating the device to open the passage and permit air to flow therethrough when the blower is not energized and when the second device is conditioned to open the first opening.

BRIEF DESCRIPTION OF THE DRAWINGS

The features and advantages of the arrangement of the present invention will become more clearly appreciated from the following description taken in conjunction with the accompanying drawings in which.

DETAILED DESCRIPTION OF THE PRESENT INVENTION

Figure 1:
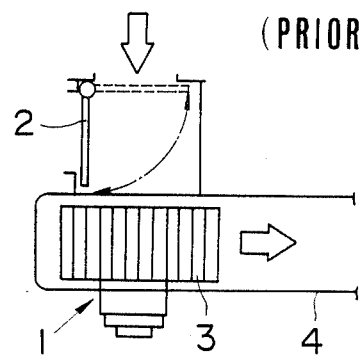
FIG. 1 is schematic section of the prior art arrangement discussed in the opening paragraphs of the present disclosure.
Figure 2:
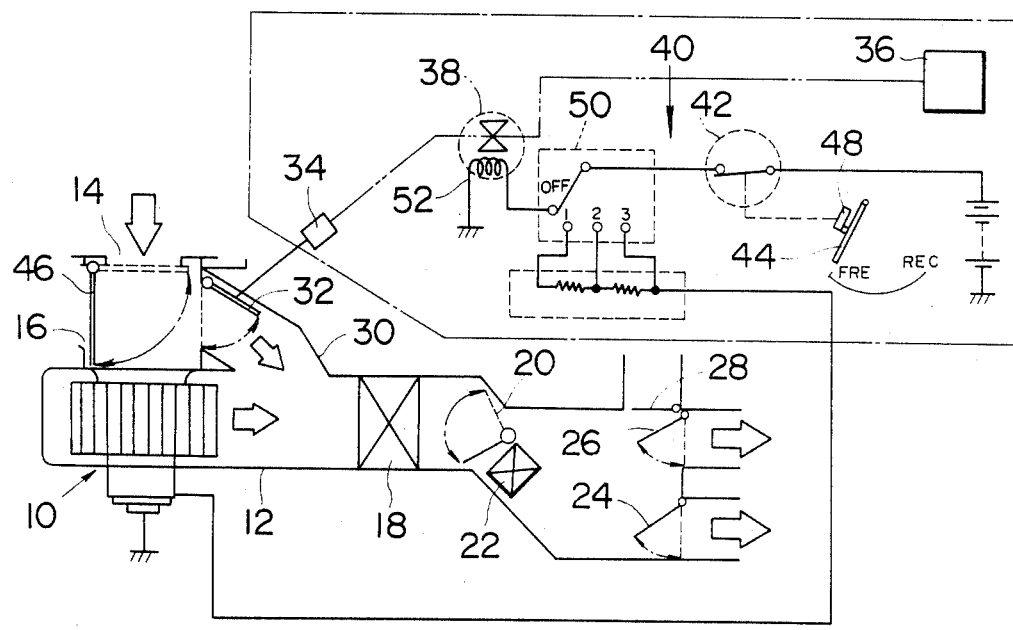
FIG. 2 is a schematic representation of a first embodiment of the present invention.

A first embodiment of the present invention is shown in FIG. 2. In this arrangement a blower 10 is arranged in a duct 12 and arranged to induct air from one of (a) a fresh air inlet 14 and (b) an inlet 16 through which air from the cabin is introduced for recirculation, and induce same to flow toward and over an evaporator 18 to a mix door 20 which controls the fraction of air flow which is exposed to a heater core 22. Located downstream of the heater core 22 are a floor door 24, vent door 26 and demister door 28.

A passage 30 is arranged to by-pass the blower 10 as shown. This passage 30 is controlled by a door 32 operatively connected to an actuator 34. In this instance the actuator 34 takes the form of an vacuum motor which is fluidly connected with a source of vacuum 36 through an electromagnetic valve 38. This valve 38 is controlled by a circuit 40 including a first switch 42 which is arranged to close in response to a select lever 44, which controls the position of the fresh/recirculate control door 46, assuming a so called "FRE" position wherein it moves the door 46 to the position illustrated in solid line and fresh air is inducted into the duct through the inlet 14. In this embodiment a microswitch 48 is arranged to be contacted by the lever 44 and to induce (through an arrangement not shown) the closure of the switch 42 upon sensing the lever 44 having assumed the just mentioned "FRE" position. The circuit further includes a second switch 50 which in this embodiment is also used to control the blower speed. In this arrangement upon the switch 50 assuming the "OFF" position thereof and the select lever 44 being set in the "FRE" position, power flows through a series connected ccoil 52 forming part of the valve 38 permitting vacuum to be supplied to the actuator 34 to open the door 32. Obviously, upon energization of the blower 10, the above described series circuit will be broken and the the door 32 will be automatically closed to maximize the effect of the blower 10.

Figure 3:
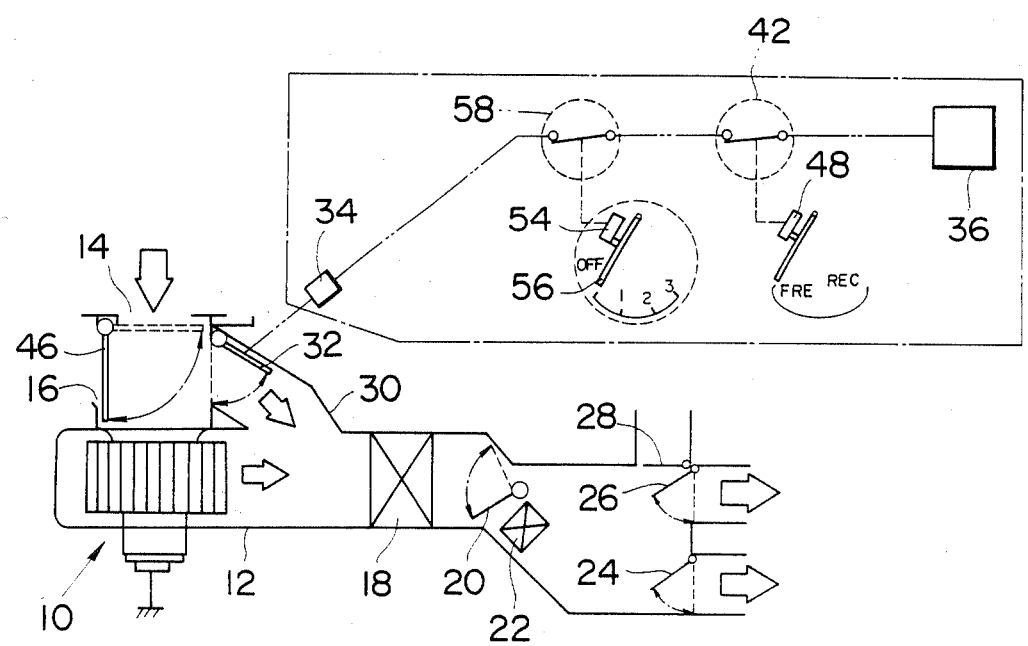
FIG. 3 is a schematic representation of a second embodiment of the present invention.

FIG. 3 shows a second embodiment of the present invention. This arrangement is essentially the same as the first and differs in that a microswitch 54 similar to that used with the select lever 44 is arranged to be switched upon the manually operable membr 56 of the blower switch being moved to its "OFF" position. This microswitch 54 is arranged to close a relay or switch 58 which is series connected with the switch 42. For the sake of simplicity of illustration the coil and source of EMF shown in FIG. 2 have been omitted from this figure.

What is claimed is:

1. A ventilation arrangement for a vehicle having a cabin, comprising:
   a duct leading to said cabin from a first opening through which fresh air from outside of the vehicle may be inducted;

a blower disposed in said duct for forcing air to flow toward said cabin when energized;

a passage which leads from said duct upstream of said blower and which merges with said duct downstream of said blower;

first means for controlling the flow of air through said passage;

a second opening in said duct upstream of said blower through which air from said cabin may be inducted;

a second means for selectively controlling the amount of air inducted through said first and second openings; and control means for operating said first means to open said passage and permit air to flow therethrough when said blower is not energized and when said second means opens said first opening.

2. A ventilation arrangement as claimed in claim 1, further comprising:

a manually operable lever operatively connected with said second means, said manually operable lever being movable between a first position wherein it opens said first opening and closes said second opening and a second position wherein it closes said first opening and opens said second opening; and a manually operable switch for selectively energizing said blower, said manually operable switch being movable between a first position wherein it de-energizes said blower and a second position wherein it energizes same.

3. A ventilation arrangement as claimed in claim 2, wherein said control means is responsive to said manually operable switch and lever assuming their respective first positions in a manner to induce said first means to open said passage.

4. A ventilation arrangement as claimed in claim 3, wherein said first means includes a vacuum motor and a door operatively connected with said vacuum motor.

5. A ventilation arrangement as claimed in claim 2, wherein said control means takes the form of first and second series connected switches, said first and second switches being arranged to close upon said manually operable switch and lever assuming their respective first positions, said first and second series connected switches being series connected between a source of power and said first means, said first means being arranged to open said passage upon said first and second series connected switches assuming their closed positions.

* * * * *